United States Patent
Duchowski et al.

(10) Patent No.: US 11,565,205 B2
(45) Date of Patent: Jan. 31, 2023

(54) METHOD FOR ADAPTING A FILTER MEDIUM TO PREDEFINABLE PARAMETERS AND PREFERABLY A FILTER MEDIUM PRODUCED ACCORDING TO SAID METHOD

(71) Applicant: HYDAC FLUIDCARECENTER GMBH, Sulzbach/Saar (DE)

(72) Inventors: John Kazimierz Duchowski, Saarbruecken (DE); Timo Lang, Neunkirchen (DE)

(73) Assignee: HYDAC FLUIDCARECENTER GMBH, Sulzbach/Saar (DE)

( * ) Notice: Subject to any disclaimer, the term of this patent is extended or adjusted under 35 U.S.C. 154(b) by 579 days.

(21) Appl. No.: 15/123,698

(22) PCT Filed: Feb. 12, 2015

(86) PCT No.: PCT/EP2015/000307
§ 371 (c)(1),
(2) Date: Sep. 6, 2016

(87) PCT Pub. No.: WO2015/135620
PCT Pub. Date: Sep. 17, 2015

(65) Prior Publication Data
US 2017/0072350 A1    Mar. 16, 2017

(30) Foreign Application Priority Data
Mar. 8, 2014    (DE) .................. 10 2014 003 314.7

(51) Int. Cl.
*B01D 39/20* (2006.01)
*B01D 29/00* (2006.01)
*B01D 35/28* (2006.01)

(52) U.S. Cl.
CPC ..... *B01D 39/2017* (2013.01); *B01D 29/0093* (2013.01); *B01D 35/28* (2013.01);
(Continued)

(58) Field of Classification Search
None
See application file for complete search history.

(56) References Cited

U.S. PATENT DOCUMENTS

| | | |
|---|---|---|
| 4,954,256 A | 9/1990 | Degen et al. |
| 6,383,386 B1 * | 5/2002 | Hying .................. B01D 53/228 210/490 |

(Continued)

FOREIGN PATENT DOCUMENTS

| | | |
|---|---|---|
| DE | 38 19 583 | 3/1989 |
| DE | 195 21 344 | 12/1996 |

(Continued)

OTHER PUBLICATIONS

Hlawacek, Gregor, "Kontaktwinkelmessung," May 12, 2005, accessed on Internet at http://instittute.unileoben.ac.at/physik/Me%DFtechnik/Kontactwinkelmessung.pdf on Feb. 18, 2018—Publication, Google Machine Translation, 24 pages.*

(Continued)

*Primary Examiner* — Chester T Barry
(74) *Attorney, Agent, or Firm* — Wenderoth, Lind & Ponack, L.L.P.

(57) ABSTRACT

A method adapts a filter medium to predefinable parameters, such as electrostatic charge, flow-rate behavior, dynamic pressure behavior or differential pressure behavior, fraction filtration efficiency and preservation of a constant quantity and quality of fluid additives. At least one of these parameters is adapted by the targeted influencing of the surface energy of the filter medium (18).

11 Claims, 3 Drawing Sheets

(52) U.S. Cl.
CPC ............... *B01D 2239/0414* (2013.01); *B01D 2239/0492* (2013.01)

(56) References Cited

U.S. PATENT DOCUMENTS

| | | | |
|---|---|---|---|
| 2010/0132559 A1* | 6/2010 | Ishida | B01D 53/228 |
| | | | 96/5 |
| 2011/0147320 A1* | 6/2011 | Sealey | B01D 39/1623 |
| | | | 210/767 |
| 2012/0083568 A1 | 4/2012 | Soucek et al. | |
| 2012/0248034 A1 | 10/2012 | Segit et al. | |
| 2015/0047732 A1* | 2/2015 | Bassler | B01D 35/06 |
| | | | 137/827 |

FOREIGN PATENT DOCUMENTS

| | | |
|---|---|---|
| DE | 197 35 993 | 2/1999 |
| DE | 199 32 383 | 1/2001 |
| DE | 10 2011 002 312 | 10/2012 |
| DE | 10 2013 000 932 | 7/2014 |
| DE | 10 2013 000 933 | 7/2014 |
| DE | 10 2013 000 934 | 7/2014 |
| DE | 10 2013 000 939 | 7/2014 |
| DE | 10 2013 020 752 | 6/2015 |
| EP | 0207588 | 1/1987 |
| JP | 62-90395 | 4/1987 |
| JP | 2002-516744 | 6/2002 |
| JP | 2003-509629 | 3/2003 |
| JP | 2004-533313 | 11/2004 |
| JP | 2012-177111 | 9/2012 |
| JP | 2013-537477 | 10/2013 |
| WO | 97/28882 | 8/1997 |
| WO | 01/19438 | 3/2001 |
| WO | 02/076576 | 10/2002 |
| WO | 2012/003111 | 1/2012 |
| WO | 2013/144241 | 10/2013 |
| WO | WO2013144241 A2 * | 10/2013 ............. B01D 35/06 |

OTHER PUBLICATIONS

International Search Report (ISR) dated May 26, 2015 in International (PCT) Application No. PCT/EP2015/000307.
Gregor Hlawacek, "Kontaktwinkelmessung", May 12, 2005, XP055188597, Retrieved from the Internet: URL:http://www.researchgate.net/publication/242304992 Kontaktwinkelmessung/links/0289ebbc0cf2fd9a99bfl4c.pdf [retrieved on May 11, 2015], cited in the ISR.
Notice of Reasons for Rejection dated Sep. 24, 2019 in Japanese Patent Application No. 2016-556724, with English-language translation.

* cited by examiner

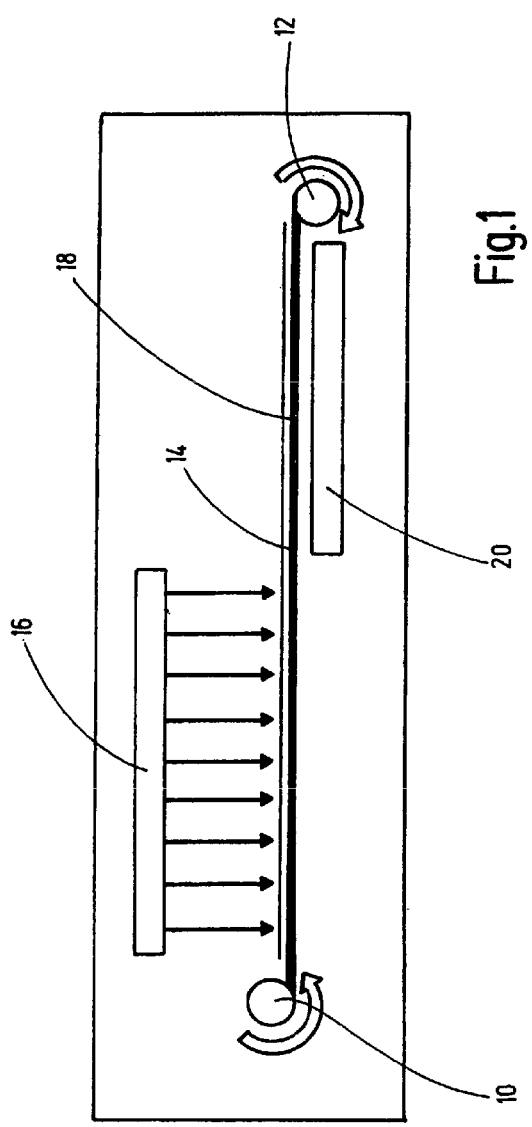
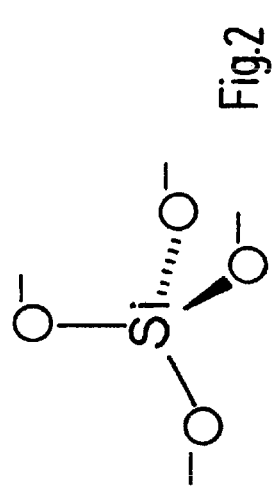

METHOD FOR ADAPTING A FILTER MEDIUM TO PREDEFINABLE PARAMETERS AND PREFERABLY A FILTER MEDIUM PRODUCED ACCORDING TO SAID METHOD

FIELD OF THE INVENTION

The invention relates to a method for adapting a filter medium to predefinable parameters, such as
- electrostatic charge,
- flow-rate behavior, dynamic pressure behavior, or differential pressure behavior,
- fraction filtration efficiency, and
- preservation of a constant quantity and quality of fluid additives.

The invention also relates to a filter medium produced preferably according to this method.

BACKGROUND OF THE INVENTION

A method and matter for rendering germproof air filter materials hydrophobic, which are preferably used in the areas of anesthesia and surgery, is known from DE 38 19 583 A1. The hydrophobic matter in question, with which the surface of the aforementioned filter materials is treated, includes silicones and silicone compounds. These compounds are brought into contact with the filter material by spraying or dipping processes or vapor deposition. The hydrophobic matter in the form of a solution or emulsion or in pure form improves the air flow of the air filter material, is physiologically harmless and meets medical-hygienic requirements.

A fuel filter or tank filler neck insert is known from DE 199 32 383 A1 as a molded part having a body made of an electrically non-conductive plastic. Its surface is coated entirely or partially with a striped, linear, lattice or net-like structure made of an electrically conductive material, preferably in the form of an electrically conductive polyacetate composition. Different areas of this structure are selectively electrically conductively connected to one another. This molded part is advantageously produced according to the monosandwich method or the sequential injection molding method.

A filter element for filtering liquids, in particular, in the form of an oil filter, is known from DE 197 35 993 A1, having a zigzag-like foldable filter strip made of a non-woven filter material. The non-woven filter material may contain metal fibers, glass fibers and/or polyester fibers. The zigzag-like foldable filter strip is produced from pre-stamped panels of non-woven filter material or from a rolled strip of non-woven filter material. The filter element, if it is constructed of glass fiber non-woven materials, may be advantageously laminated or coated on one or both sides with polyester fibers. In this way, a type of grooving or other imprinting may be easily carried out. The sensitive glass fiber non-woven material may be processed to form a star-like pleated filter element without additional protective non-woven material on the inflow side or the outflow side and, if applicable, also with no backing.

Thus, the state of the art is to modify, in particular, to finish known filter media for air, fuel and oil filtration using corresponding coating methods, to thereby create improved characteristics for the respective filter medium. However, this finishing does not include a targeted adaptation to pre-definable desired parameters. Instead, depending on the parameter or requirement profile, the respective filter medium is coated more or less randomly and in a trial and error fashion with materials from which there is hope of corresponding improvements in the operation of the filter medium.

SUMMARY OF THE INVENTION

An object underlying the invention is the improved targeted adaptation of the filter medium to the exemplary parameter values described above.

This object is basically achieved by a method and a filter medium where the adaptation of at least one of the aforementioned parameters is provided by a targeted influencing of the surface energy of the filter medium. The adaptation no longer takes place in a random and experimental fashion, but rather is targeted, by considering the respective surface tension of fluids, such as hydraulic oil, fuel or air, and/or of solid bodies, such as filter element materials (filter medium). This consideration of the surface energy is based on the finding that the surface energy of the respective filter medium can be divided into a disperse fraction and a polar fraction, and that by appropriate selection of coating methods and of coating and infusion media, the respective proportion of the disperse and polar fractions are adjustable relative to one another. The filter medium treated in this manner is then adapted to the predefinable parameters optimal for its operation.

To determine the respectively prevailing surface energy, in addition to its disperse or polar fractions, a contact angle measurement is preferably used, specifically, on the filter medium itself and/or on the fluid flowing through the filter medium. If, for example, the determining parameter for the filter medium is the electrostatics, in the sense that an electrostatic charge, which may damage the filter medium material, is to be avoided, the magnitude of the difference between the surface tension of the hydraulic oil to be filtered and the surface energy of the filter material or filter medium is the crucial factor in the charging of the oil. In such case, the more similar the materials are in terms of their surface energy, the less oil charging is expected during operation. Thus, based on the tribo-electrical series known for materials, the material of the filter medium, in terms of the surface energy to be determined, must be designed in a way similar to the hydraulic oil to be filtered and the coating material used.

The flow rate behavior, which is reflected in the differential pressure, may likewise be decisively influenced by adjusting the surface energy of the filter medium. As the hydrophobicity of the material increases, so too does the bubble point, i.e., the pressure that is required to push the fluid for the first time into the pores of the filter medium, as based on the Washburn equation. If the material is wetted, the flow rate resistance decreases as a result of the "repulsion of the liquid" by the hydrophobic coating at the boundary surface between the filter medium and the liquid. Areas of application include primarily air filters, in addition to hydraulic filters. Comparable considerations also apply if the intention is to decisively influence the water entry pressure (dynamic pressure) by adjusting the surface energy of the filter medium.

The fraction filtration efficiency or the coalescence factor as an additional parameter may also be influenced by adjusting the surface energy of the filter medium. As the hydrophobicity of the filter medium (filter material) rises, the fraction filtration efficiency is able to increase significantly. The filter medium is then significantly more resistant to penetration of liquid droplets from the air, so that such droplets can be more easily separated from an air flow. This effect may be employed as a barrier, for example, for the separation of oil mist, in the case of air filters, ventilation filters or coalescence filters.

In preserving a constant quantity and quality of fluid additives, the undesirable separation of oil additives from the fluid may be avoided, which counteract oil ageing, for example, specifically, again by manifest adjustment of the surface energy. Additives dispersed in oil present as non-dissolved substances, for example, in the form of silicon droplets as anti-foam additives for the oil, are separated on the surface of the filter medium as a result of boundary surface effects, such as Van-der-Waals forces and the like. These effects are reduced, if not outright prevented, by a targeted change of the surface energy. Accordingly, surface modified filter media may be "smoother" during filtration and help to avoid intrusions of oil in the additive packet.

Based on the targeted split of the surface energy into polar and disperse fractions, theoretical combinations for complete wetting may be represented by predefinable reference curves (wetting envelope). Based on these curves, one can reliably estimate the wetting behavior or other effects of the filter medium in relation to the liquid to be wetted.

The subject matter of the solution according to the invention is also a filter medium. The filter medium is produced at least in part from glass fibers, which are encased in a non-bonding manner at least partially by polymerized silicon dioxide molecules, or the glass fibers form a covalent bond with fluoropolymers, polyethylene or polypropylene. In addition, the following coatings have proven advantageous for modifying the surface energy of the filter medium, for example, in the form of polydimethylsiloxanes (PDMS) or in the form of poly-3,4-ethylenedioxythiophene (PEDOT).

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure and that are schematic and not to scale:

FIG. 1 is a side view of the structure of a device for finishing the filter material or filter medium by a sol-gel spray method;

FIG. 2 is a structural formula for a molecule of the silicon dioxide used for coating;

DETAILED DESCRIPTION OF THE INVENTION

Figure 3:
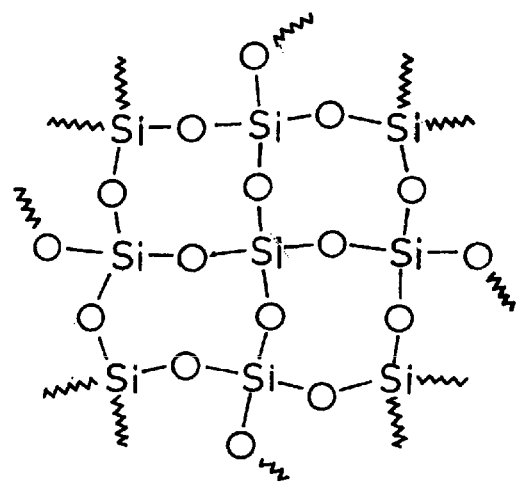
FIG. 3 is a structural formula of the silicon dioxide molecules cross-linked with one another.

Filter media, in particular, in pleated form, and filter elements constructed therefrom, in particular for the filtration of fluids, such as hydraulic oil, are sufficiently known and described in detail, for example, in the applications for patent rights DE 10 2013 000 932, DE 10 2013 000 933, DE 10 2013 000 934, DE 10 2013 000 939, DE 10 2013 020 752, etc. of the property rights owner. These filter media are not discussed in further detail at this juncture. The filter medium according to the invention, along with its respective method of production, will be described below only insofar as it concerns the finishing, in particular, by the targeted influencing of the surface energy of the filter medium.

Filter media, even when they are constructed in multiple layers and include protective non-wovens and support screens, regularly exhibit a high percentage of glass fibers for the filtration of fluids, such as air, gases, process water, fuel and lubricants as well as hydraulic oil, etc. The glass fibers for filtration, in addition to silicon dioxide, also include other oxides, such as aluminum (Al), barium (Ba), boron (B), calcium (Ca), potassium (P), magnesium (Mg), manganese (Mn) and zinc (Zn), in various compositions. In addition to the commonly known borosilicate glass, special glass compositions are also used, such as low alkali, ferrous glass (E-glass); acid-resistant high carbon glass (C-glass); low heavy metal glass; low boron glass or quartz glass. The components are mixed and melted together and cooled to form glass beads or pellets. By re-melting and pressing the liquid glass through nozzles, the glass is stretched and deposited on a metal screen. As a further type of production, glass rods are heated and stretched by a glass flame and subsequently deposited on a screen.

The resultant glass fibers are further processed in a paper machine to form filter material. In the process, the glass fibers are dispersed in water in a pulper. To lend strength to the glass fibers, the fibers are bonded using an acrylate or epoxy resin. Before finally being deposited, such a binder is placed on the wet paper web under a vacuum on a screen or at the end of the screen. The glass fiber medium is subsequently dried in a drying stage and is suitable for use as a filter material.

Another filter material used very frequently for a filter medium is made of melt-blown fibers. Melt-blown fibers are regularly produced in a process, in which non-woven materials are produced directly from granulate. A specialized weaving method is used in combination with high-velocity hot air to produce fine fibered materials having different structures. Granulate melted in an extruder is fed directly into a nozzle block via a spinning pump. The polymer, once it has exited through the nozzle tips, is drawn by compressed process hot air. The resultant microfiber non-woven is deposited on an air-permeable sieve belt. To produce the laminates, the melt-blown unit is extended by an uncoiler in front of and behind the nozzle. A calander bonds the fed materials to one another. Potential feed materials include polypropylene (PP), polybutylene terephthalate (PBT), polyethylene (PE), polyamide (PA) and other comparable plastics. Each filter material produced in this way is then pleated with additional filter layers (wire mesh, non-wovens, nets) in knife pleating machines or rotary pleating machines and further processed to form a complete filter element. The production methods described above likewise form part of the prior art.

The following describes how such known fiber material of the filter media is correspondingly finished. As a departure from the production solution for a filter medium described above, at least one finishing step for the filter material or filter medium is carried out before the medium is pleated. Thus, the completely fabricated glass fiber filter material is finished prior to pleating using a spray technique. For this purpose, a sol-gel spray method is carried out in an appropriate device according to the illustration in FIG. 1. For this purpose, the glass fiber medium present on a roll is wound up and down between two roller units 10, 12 in the directions indicated by the arrows. One or multiple spray bars 16 are located in the transport path 14 between the two roller units 10, 12. By the spray bar, the filter material 18 is sprayed with a coating material according to the vertical arrows depicted. The wet chemical finishing applied to the glass fiber paper in this manner is dried in a connecting drying path 20 and subsequently rolled up again via the downstream roller unit 12. The filter medium rolled up in this manner may then be fed directly to the previously mentioned pleating process for producing the complete element. Instead of the aforementioned spraying process, the coating material could also be applied by an immersion bath (not depicted).

Preferably, polymerized silicon dioxide molecules are used as a coating material for this wet chemical sol-gel method of application. The molecules may be used in combination with other chemical substances, for example, iron, magnesium, calcium, fluorine, etc. and, in particular, as further modifications of the oxides of silicon. The thickness of the coating may be individually adapted to the filtration task from several nanometers up to a micrometer by the adaptation of the parameters during the application process.

Whereas the individual silicon molecule is reproduced in the manner of a structural formula in FIG. 2, FIG. 3 shows the cross-linked arrangement of this type of silicon dioxide ($SiO_2$) molecules. Due to the electro-negative oxygen groups depicted in FIG. 2, the cross-linking occurs as a result of Van der Waals forces between the individual molecular groups. For such a bonding, the molecules were initially dispersed in a liquid carrier fluid, for example, in the form of water. The carrier fluid is removed in the drying path 20. The molecules remaining as the coating are then, as previously explained, self-cross-linking, that is, they become geometrically aligned and form a coherent structure. As a result, the glass fibers or melt-blown fibers are virtually completely encased and therefore coated, without a chemical bond forming between the fiber furnish material and the coating material.

The main focus of attention of the present coating is in the increase in hydrophobicity (oleophobicity). The surface energy may be determined by measuring the contact angle CA (sessile drop) (for example, using the Owens, Wendt Rable, Kälbe, Wu methods, etc.). Additional test methods involving the determination of the surface energy are the Du Pont test methods or the 3M water repellency test.

Figure 4A:
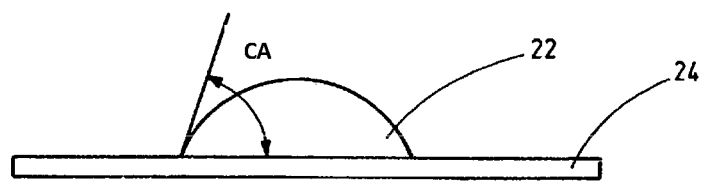
FIGS. 4a and 4b are graphic depictions of the respective contact angle relative to water and oil by changing the surface energy of the filter medium by the respective coating method according to the invention.

When measuring the contact angle, the surface energy or surface tension of the filter material can be determined indirectly. Untreated filter materials made of glass fiber plastics generally have a contact angle CA relative to water ($H_2O$) and/or oil of <90°, which is shown in FIG. 4a for a corresponding drop 22, which wets a horizontal surface 24. With the coating according to the invention described above, however, the contact angle CA relative to water and oil can be increased significantly higher than 90°, as per the illustration according to FIG. 4b.

Figure 5:
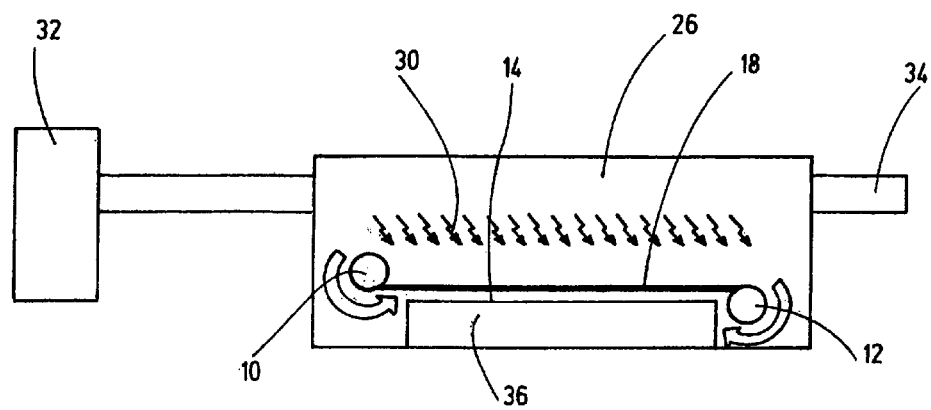
FIG. 5 is a side view of the structure of the device for finishing the filter medium by separating monomers from the gas phase.

FIG. 5 shows another finishing process for the filter material, this time by separating fluoropolymers from the glass phase. The completely fabricated glass fiber filter material is finished from the gas phase separation by a reaction taking place in a vacuum, again prior to the pleating step. In this process, the glass fiber medium present on a roll is again wound down and up again between the two roller units 10, 12, as indicated by the directions of the arrows. The transport path 14 is located this time in a vacuum chamber 26, in which the filter material 18 is later treated with a coating material.

The entire device system is moved into a low pressure vacuum and an initial plasma activates the surface by forming locations of free radicals on the surface of the substrate in the form of the glass fiber material. A coating material made of monomer gas introduced into the chamber 26 forms covalent bonds on the surface of the substrate or filter material 18 at the locations of the free radicals. Thus, the coating material is anchored on the surface and is extremely resistant. A subsequently produced pulsating plasma 30 activates the applied coating monomer and causes the polymerization of the material at the surface of the filter medium 18. The internal pressure of the chamber is then returned to ambient pressure and the filter material is coated so as to be hydrophobic/oleophobic. The monomer gas, before entering the actual vacuum chamber 26, is stored in an antechamber 32 and the vacuum chamber 26 may be fitted on its output side with a type of exhaust gas post-treatment device 34. Since the plasma separation can release very high amounts of energy, a box-shaped cooling device 36 is attached to the underside of the transport path 14 in question for cooling the filter medium or filter material 18.

Preferably all fluoropolymers are considered as coating material for this method of finishing from the gas phase. However, the following monomers in particular, are suited to be polymerized as coating material in this method:
Ethylene (E)
Propylene (P)
Vinylfluoride (VF1)
Vinylidene fluoride (VDF or VF2)
Tetrafluoroethylene (TFE)
Hexafluoropropylene (HFP)
Perfluoropropylvinylether (PPVE)
Perfluoromethylvinylether (PMVE)
Chlorotrifluoroethylene (CTFE)

Final products belonging to the group of fluoropolymers as coating material are, in particular:
PVF (polyvinyl fluoride)
PVDF (polyvinylidene fluoride)
PTFE (polytetrafluoroethylene)
PCTFE (polychlorotrifluorethylene)
PFA (perfluoroalkoxy polymer)
FEP (fluorinated ethylene-propylene)
ETFE (polyethylene tetrafluoroethylene)
ECTFE (polyethylene chlorotrifluoroethylene)
FFPM/FFKM (perfluorinated elastomer [perfluoroelastomer])
FPM/FKM (fluorocarbon [chlorotrifluoroethylene vinylidene fluoride])
PFPE (perfluoropolyether)
PFSA (perfluorosulfonic acid)

Figure 4B:
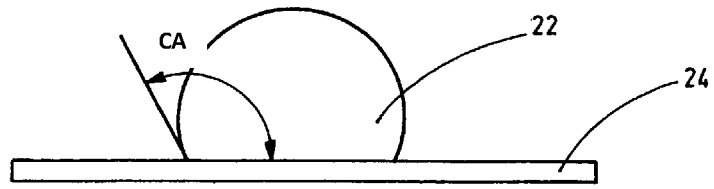

The thickness of the coating may again be adapted individually from several nanometers up to a micrometer by the adaptation of the parameters during the application process. Comparable contact angles CA also result, as they are shown in FIGS. 4a and 4b. The last mentioned coating is suitable on the whole in the area of filtration of hydraulic oil and lubricating oil as well as in the area of air filtration and fuel filtration.

In addition to the plasma-enhanced chemical gas phase separation, as introduced above, other chemical gas phase separations may also be used. Physical gas phase separations are equally suitable, in plasma-enhanced form as well. In addition to the coating materials described above, polydimethylsiloxane (PDMS) has also proven very reliable, as well as polythiophene of various types. Fibers made of plastic materials, including cellulose materials, which may also be impregnated with phenolic resin, may also be used in place of the glass fiber materials and the melt-blown fibers.

For an exact determination of the surface tension of liquids and solid bodies, the former is divided into a polar fraction and a disperse fraction. Whereas the polar fraction of the surface tension results from a dipole-dipole interaction and from the hydrogen group bonding or the Lewis-acid-base interaction, the disperse fraction of the surface tension is properly characterized by a Van der Waals interaction.

Figure 6:
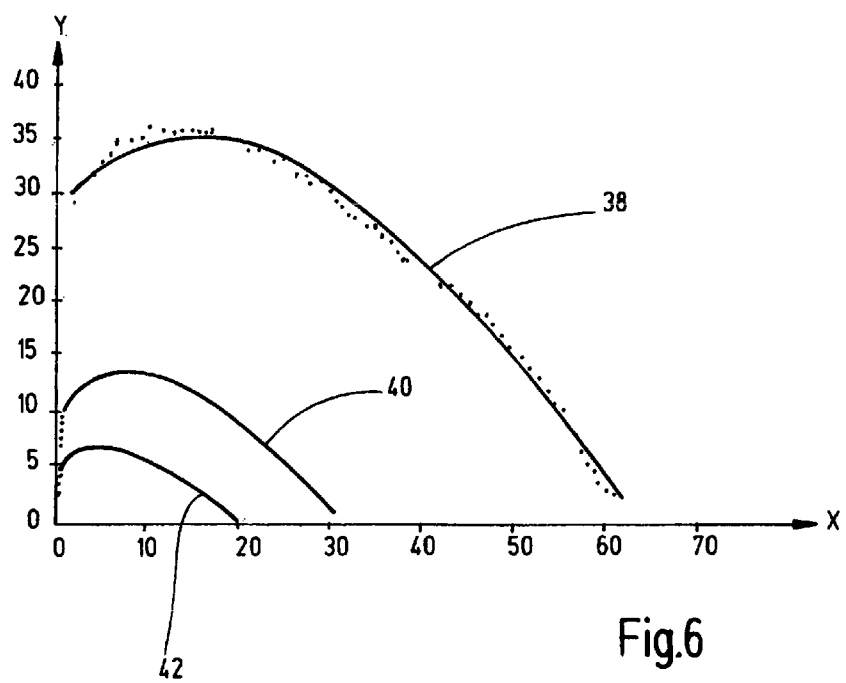
FIG. 6 is a graphic of a wetting envelope scheme for filter materials.

FIG. 6 shows a wetting envelope for filter materials, divided into a polar fraction of the surface energy in the y-direction and the disperse fraction of the surface energy plotted in the x-direction. Each fraction of the surface energy is determined in accordance with the Kälble method (OWRK), wherein the uppermost delineated curve 38 with its single measured values represented by dots relates to a standard filter material. The underlying curve 40 relates to a coated filter material, wherein polydimethylsiloxane (PDMS) is used as the coating material. The underlying third curve 42 relates to a coated filter material, wherein in this case a gas phase separated fluoropolymer was used. A predefinable modification of polar and disperse fraction of the surface tension is possible, depending on the base material of the filter medium and the respective fluid to be filtered with the filter medium that includes this coating material, which may also be applied as a multilayer composite, and that includes the layer thickness thereof.

By practical trials or by basic theoretical considerations associated with each filtration task along with the desired parameter, for example, determining a favorable curve profile of the surface tension is possible. Then, based on these findings obtained, the finishing process can be selected for any arbitrary filter material or filter medium in such a way that the predeveloped wetting envelope-curve (FIG. 6) results in cooperation with the liquid or fluid to be filtered. This notion of the specific finishing by adjusting the polar and disperse fractions of the surface energy for filter materials and filter media as such has no equivalent in the prior art.

While various embodiments have been chosen to illustrate the invention, it will be understood by those skilled in the art that various changes and modifications can be made therein without departing from the scope of the invention as defined in the claims.

The invention claimed is:

1. A method for adapting a hydraulic filter medium to predefinable parameters, comprising the steps of:
    providing the hydraulic filter medium;
    adapting the hydraulic filter medium to at least one of predefinable parameters of electrostatic charge, flow rate behavior, fraction filtration efficiency, and preservation of a constant quantity and quality of fluid additives by a targeted influencing of a surface energy of the hydraulic filter medium, the adopting of the hydraulic filter medium of the predefinable parameters being a wet chemical coating method;
    subdividing the surface energy of the hydraulic filter medium into a disperse fraction and a polar fraction, the surface energy of the hydraulic filter medium and the disperse and polar fractions being determined by a contact angle measurement on the hydraulic filter medium;
    adjusting proportions of the disperse fraction and the polar fraction relative to one another by selection of a coating method and by a selection of a coating media to optimize the predefinable parameters, the adjusting proportions being by the coating media being applied to the hydraulic filter medium such that the coating media encases fibers of the filter medium being coated by a self-cross-linking with free radicals of the fibers of the hydraulic filter medium such that the coating media is polymerized on at least portions of a surface of the hydraulic filter medium; and
    pleating the hydraulic filter medium.

2. A method according to claim 1 wherein the wet chemical coating method is a sol-gel spray method.

3. A method according to claim 1 wherein the wet chemical coating method uses silicon dioxide molecules.

4. A method according to claim 3 wherein the silicon dioxide molecules are polymerized.

5. A method according to claim 3 wherein the silicon dioxide molecules are combined with at least one of iron, magnesium, calcium or fluorine.

6. A method according to claim 1 wherein the adjusting proportions is by the selection of the coating media with the coating media having a thickness from several nanometers up to 1 micrometer depending on a filtration task.

7. A method for adapting a hydraulic filter medium to predefinable parameters, comprising the steps of:
    providing the hydraulic filter medium;
    adapting the hydraulic filter medium to at least one of predefinable parameters of electrostatic charge, flow rate behavior, dynamic pressure behavior, differential pressure behavior, fraction filtration efficiency, or preservation of a constant quantity and quality of fluid additives, by a targeted influencing of a surface energy of the hydraulic filter medium;
    subdividing the surface energy of the hydraulic filter medium into a disperse fraction and a polar fraction;
    adjusting proportions of the disperse fraction and the polar fraction relative to one another by selection of coating methods and by selections of a coating media and infusion media to adapt and optimize the hydraulic filter medium the at least one of the predefinable parameters, the coating media being a coating material that encases fibers of the hydraulic filter medium in a self cross-linking manner or that forms covalent bonds with free radicals of the fibers of the hydraulic filter medium such that the coating material is polymerized on portions of a surface of the hydraulic filter medium, the coating methods being a wet chemical coating method, a chemical gas coating method or a physical gas coating method;
    determining the surface energy together with the disperse fraction and the polar fraction by a contact angle measurement; and
    pleating the hydraulic filter medium after the adapting of the hydraulic filter medium.

8. A method according to claim 7 wherein the coating method is wet chemical coating method and uses silicon dioxide molecules.

9. A method according to claim 8 wherein the silicon dioxide molecules are used as further modifications of oxides of silicon in combination with iron, magnesium, or fluorine.

10. A method according to claim 7 wherein
the coating method is the chemical gas coating method and uses monomers polymerized to form fluoropolymers, polyethylene or polypropylene.

11. A method according to claim 7 wherein
the coating material is polydimethylsiloxane or poly(3,4-ethylenedioxythiophene).

\* \* \* \* \*